US005797191A

United States Patent [19]
Ziegert

[11] Patent Number: 5,797,191
[45] Date of Patent: Aug. 25, 1998

[54] PARALLEL KINEMATIC STRUCTURE FOR SPATIAL POSITIONING DEVICES AND METHOD OF INITIALIZING SAME

[75] Inventor: John C. Ziegert, Gainesville, Fla.

[73] Assignee: University of Florida, Gainesville, Fla.

[21] Appl. No.: 720,146

[22] Filed: Sep. 25, 1996

[51] Int. Cl.⁶ ........................................... G01B 5/03
[52] U.S. Cl. ...................... 33/503; 33/559; 33/DIG. 1
[58] Field of Search ........................... 33/1 M, 503, 504, 33/556, 557, 558, 559, 560, 561, DIG. 1; 73/866.5

[56] References Cited

U.S. PATENT DOCUMENTS

| | | | |
|---|---|---|---|
| 4,859,817 | 8/1989 | Cassani | 33/561 |
| 4,866,854 | 9/1989 | Seltzer | 33/558 |
| 4,942,671 | 7/1990 | Enderle et al. | 33/559 |
| 5,074,052 | 12/1991 | McMurtry | 33/556 |
| 5,125,261 | 6/1992 | Powley | 73/1 J |
| 5,179,525 | 1/1993 | Griffis et al. | 364/512 |
| 5,319,858 | 6/1994 | Coy | 33/561 |
| 5,396,714 | 3/1995 | Sturges, Jr. et al. | 33/644 |
| 5,412,880 | 5/1995 | Raab | 33/503 |
| 5,428,446 | 6/1995 | Ziegert et al. | 356/358 |

Primary Examiner—G. Bradley Bennett
Attorney, Agent, or Firm—Kerkam, Stowell, Kondracki & Clarke; Dennis P. Clarke

[57] ABSTRACT

A coordinate measuring machine (CMM), including three spherical base joints, a device for maintaining the base joints in a fixed spaced relation, and six actuator assemblies each having a variable length. Each of the base joints has a first end of two of the six actuator assemblies connected therewith, respectively. A center pole is provided having a first spherical joint connected to a first end thereof and a second spherical joint connected to a second end thereof. A second end of a first one of each of the two actuator assemblies connected to each of the base joints is connected to the first spherical joint of the center pole, and a second end of a second one of each of the two actuator assemblies connected to each of the base joints is connected to the second spherical joint of the center pole, in a manner which forms a hexahedron. The coordinate measuring machine further includes a probe mounted at one end of the center pole and a laser interferometer for determining a change in length of each of the six actuator assemblies upon movement of the probe. A method for initializing the CMM and an improved universal joint having a reference sphere therein for use in the CMM are also disclosed.

20 Claims, 2 Drawing Sheets

PARALLEL KINEMATIC STRUCTURE FOR SPATIAL POSITIONING DEVICES AND METHOD OF INITIALIZING SAME

BACKGROUND OF THE INVENTION

Reference is hereby made to provisional patent application Ser. No. 60/004,253 filed Sep. 25, 1995, the benefit of the filing date of which is claimed herein.

1. Field of the Invention

The present invention relates to a kinematic structure for spatial positioning devices and, more particularly, to a hexahedron coordinate measuring machine (CMM), a method of initializing same and an improved universal joint for use in connection with coordinate measuring machines.

2. State of the Art

The present invention concerns the application of a novel parallel kinematic system to coordinate measuring machines. Coordinate measuring machines (CMMs) are widely used in industry for dimensional inspection of manufactured parts. CMMs normally consist of several functional components. A table is provided where the parts to be measured can be fixtured. A probe senses the edges and surfaces of the features to be measured on the part. A kinematic structure provides relative motion between the part and the probe and allows the probe to be moved to the proper locations on the part. A position sensing system reports the spatial coordinates of the probe at each measured location. These coordinate locations are processed by measurement software to determine the locations, dimensions and geometry of the part features.

The vast majority of CMMs use a kinematic structure consisting of a serial chain of three prismatic joints arranged to be mutually perpendicular, thus providing a physical embodiment of a Cartesian coordinate system. The position sensing system is then provided by displacement sensors (scales) along each slide (coordinate axis). A variety of probes may be carried by these machines, including touch-trigger, capacitance and optical devices. Since this kinematic structure does not allow the probe to be oriented with respect to the workpiece, some probe manufacturers provide motorized or manual indexing capability. This allows the probe to be oriented as needed with respect to particular features on the part.

The measurement accuracy of these types of CMMs is greatly affected by the precision with which the individual components are manufactured and assembled. Individual axis slides will not be perfectly straight or orthogonal to the others. Elastic deformations of the structural components compound this problem. For this reason, CMM components are typically designed to be as stiff as possible which often results in large, heavy machines.

Significant improvements in CMM accuracy can be achieved if the positioning errors of the machine are pre-measured and compensation software is used to process the output data. This approach is currently in widespread use by CMM manufactures and allows the accuracy of the machines to be improved at a reasonable cost.

Despite the significant improvements in CMM performance over the past decade, several factors still limit CMM accuracy, speed and economic utility. Thermal variations in the CMM environment cause expansion and contraction of the individual components. This, in turn, distorts the elements of the kinematic structure, causing positioning errors of the probe tip. CMM manufacturers routinely supply algorithms to compensate for thermal expansion and contraction of the machine scales. Special software uses temperature sensors on the individual scales to modify the scale output based on the coefficient of thermal expansion of the scale material. If all parts of the machine are at the same temperature, then this approach is satisfactory. However, in an environment where the temperatures change or there are heat sources in the vicinity of the CMM, thermal gradients will occur in the machine structure. These gradients will distort the machine geometry in a manner which cannot be corrected by currently available methods, thus causing a serious degradation in the accuracy of the machine. For this reason, virtually all CMMs used for moderate- to high-precision inspection are housed in specially constructed rooms with carefully controlled environments. This requirement substantially increases the cost of CMM installation and usage. Furthermore, it forces the CMMs to be somewhat remote from the manufacturing floor, causing a disruption in the production flow and decreasing the utility of the machines.

A second limitation on CMMs performance is related to their dynamic performance. When large numbers of parts are being inspected, the inspection time becomes critical. For any given part geometry and features to be inspected, the inspection time is largely determined by the speed with which the CMM can move the probe tip from point to point. However, high speeds and accelerations are difficult to obtain when the kinematic structure is made up of large elements with significant mass. Furthermore, these machines typically possess very small damping, due in large part to the air-bearing slides used to reduce friction and hysteresis in the axis motions. The result is that significant vibrational deflections of the machine structure may occur when the machine speeds and accelerations are high. These deflections also cause a loss of accuracy and repeatability of the machines.

The CMM kinematic structure of the present invention is based on arranging the actuators in a parallel, as opposed to a serial, fashion. The most well-known example of a parallel manipulator is the Stewart Platform. Recently, machine tools based on variations of this architecture have been introduced. Parallel mechanisms of this type have six prismatic actuators connecting the moving body (platform) to the fixed body (base). Each of these actuators is connected to each of the bodies by spherical joints. By proper control of the individual actuator lengths, the position and orientation of the platform can be controlled in all six spatial degrees of freedom.

For fixed geometries of the base and platform, it is possible to formulate analytical expressions which give the position and orientation of the platform with respect to the base in terms of the lengths of the six actuators and the coordinates of the centers of each of the spherical joints on the base and platform. These expressions take the form of high order polynomials (up to 40th order), each root of which corresponds to a possible position and orientation.

Parallel mechanisms of this type are generally thought to possess outstanding rigidity relative to their weight. However, the reachable work volume tends to be small compared to the overall size of the machine. The first machine tools based on this architecture are just now becoming commercially available. More research, study and experience will be needed to assess their success or failure.

The design of a machine to perform precision dimensional measurement requires several basic tasks to be completed. First, a length reference (metric) and a means of transferring or establishing that metric in the workspace of the machine must be established. Second, a reference coordinate system whose origin and geometry are known must be established. Third, the generation of repeatable motions of the probe relative to the workpiece in a manner such that these motions can be measured relative to the reference coordinate system using the metric must be enabled. Fourth, the characteristics of the probe must be known since it links the measuring machine to the part being measured. The accuracy of the machine will depend on the degree of success in accomplishing each of these tasks.

A number of design principles which experience has shown will lead to accomplishing these tasks in an optimal manner are as follows:

1. Isolation of the device, which means that the disturbing effects of environmental factors such as temperature, humidity, vibration, etc., on the accuracy of the instrument should be minimized. Design strategies include control of the environment, decoupling from the environment and design of the instrument so that its response to these disturbances is minimal. Current generation CMMs typically make use of the first strategy, i.e., control of the environment.

2. Whenever one body is mounted on another, the connection between the two should be designed to provide the minimum level of constraint necessary. Overconstraint or redundant constraints will cause the bodies to distort in a manner which is difficult or impossible to predict. The principle of exact mechanical constraint is termed "kinematic mounting."

3. The alignment principle, or Abbe principle, is also known as "the first principle of mechanical design and dimensional metrology." Satisfaction of the alignment principle requires that the measurement axis of the displacement measuring system be placed so that its line of action passes through the point whose displacement is to be measured, i.e., the probe tip. If this is not possible, i.e., there exists an offset between the point of interest and the measurement axis, then the angular motions of the carriage must be measured and the displacement of the point must be calculated based on their effect. It is difficult or impossible to design a Cartesian mechanism so that the displacement measuring devices on the individual axes satisfy the Abbe principle.

4. If possible, the metrology system should be separate from the structural loop which carries the forces due to the weights and inertias of the moving elements of the machine so that deformations of the structural members under these loads do not induce metrology errors. Because of the added expense, most current generation CMMs do not use a separate metrology frame.

The design principles given above can be used to formulate a set of design requirements necessary to obtain accuracy in Cartesian CMMs with a serial kinematic structure, as follows:

1. The guideways should be as straight as possible. This is necessary since it is impossible to satisfy the Abbe alignment principle for all three axes. Therefore, extremely straight guideways are needed to prevent the moving bodies from rotating and causing displacement errors. It has been postulated that, using conventional practice (i.e., manufacturable at a reasonable cost), straightnesses of 1 μm/m are achievable.

2. The machine elements should be very stiff. Creation of very straight guideways is not sufficient if they sag under the weight of the moving bodies which they must support. This leads inevitably to large, heavy structures; i.e., qualities which are detrimental to the dynamic capabilities of the machine.

3. The guideways must be aligned very precisely. The guideways essentially form the reference coordinate system for displacement measurements in many machines. Therefore, if they are not arranged to be perfectly orthogonal to each other, measurement errors will result.

4. A reliable and accurate displacement measuring system is required for measuring displacements of the individual slides along the guideways.

It is interesting to compare the design requirements for accuracy in parallel kinematic structures with those for serial kinematic structures. In parallel structures, the position and orientation of the moving body are obtained from the solution of a set of geometric relationships. The inputs to these relationships are the geometry of the base and platform (i.e., the coordinates of the centers of the spherical joints), and the absolute lengths (distances between joint centers) of the six actuators. Therefore, in order to achieve accuracy in a parallel mechanism, one needs to realize the following requirements:

1. The spherical joints should produce perfect spherical motion. The actuators must rotate about fixed points on the base and platform.

2. The absolute distance between the centers of corresponding spherical joints on the base and platform must be measured with a high degree of accuracy. This is in distinct contrast to serial mechanisms where only the displacement along each axis is needed. In general, displacement measuring devices will be used to measure the changes in length of the individual legs. Therefore, a system for determining the initial lengths must be developed since it will be impossible to bring the joint centers on the base and platform into coincidence to make the leg length equal zero, thus providing an absolute reference for the displacement measuring system.

3. The geometry of the base and platform must be stable and known to high accuracy. Since the position of the probe is dependent on the coordinates of the joint centers on the base and platform, it follows that any deformations of these bodies will cause errors in that position. Therefore, the base and platform should be rigid and thermally stable. This is a difficult design requirement since the base is physically large for machines with usefully large work volumes. Therefore, the joint centers are physically separated by a significant effective length of material. Any temperature changes in that material may result in significant changes of the geometry and lead to large positioning errors. This requirement can be relaxed if it is possible to monitor the actual positions of the joint centers while the instrument is in use.

The first two requirements are descriptions of the functional capabilities of the laser ball bar (LBB), described in U.S. Pat. No. 5,428,446 issued Jun. 27, 1995. The LBB is essentially an extensible prismatic strut with spherical joints on the ends. These spherical joints are formed by precision spheres riding in magnetic sockets. The magnetic sockets maintain three-point contact with the spheres in conformance with the principle of kinematic mounting. Spheres with form accuracies better than 5 μin (125 nm) are readily and inexpensively obtainable. When combined with the magnetic sockets, the resulting joint produces spherical motion to within 2.5 μin (62.5 nm).

A laser interferometer is used with the LBB to measure displacements or length changes of the LBB. The initialization fixture allows the output of the interferometer to be initialized to the absolute distance between the centers of the spherical joints. In fact, the trilateration procedure used by the LBB to measure the spatial coordinates of the tool can be viewed as a degenerate form of Stewart platform mechanism. If the platform of such a mechanism shrinks to a single point so that all of the joint centers on it become coincident, then a tetrahedron is formed. The LBB sequentially measures the lengths of the sides of this tetrahedron to obtain the spatial coordinates of the apex. Thus, the LBB naturally satisfies two of the design requirements for accurate parallel mechanisms.

Thus, a need exists for an improved coordinate measuring machine (CMM) that satisfies the requirements set forth above, but does not have the disadvantages of known CMMs. There is a further need for a platform-type device with high positional accuracy, which device uses the LBB as a building block for creating the device.

SUMMARY OF THE INVENTION

It is, therefore, a primary object of the present invention to provide an improved coordinate measuring machine for dimensional inspection of manufactured parts, or the like.

A further object of the present invention is to provide an improved coordinate measuring machine having actuators arranged in parallel and similar in structure to the actuators used in the laser ball bar (LBB) disclosed in U.S. Pat. No. 5,428,446.

Another object of the instant invention is to provide an improved coordinate measuring machine which is self-initializing.

Yet another object of the instant invention is to provide an improved coordinate measuring machine which is insensitive to changes in environmental conditions and does not require a temperature controlled environment for accurate operation.

An additional object of the invention is to provide an improved coordinate measuring machine that is operable to continuously self-initialize so as to automatically compensate for thermally induced changes in the parts comprising the machine.

A more specific object of the instant invention is to provide an improved coordinate measuring machine which does not require the use of large, heavy parts, and enables the probe thereon to be moved relatively quickly between coordinates.

Still another object of the invention is to provide an improved coordinate measuring machine which has a relatively large locus of attainable positions.

A further object of the invention is to provide a method of initializing a hexahedron coordinate measuring machine.

Yet another object of the invention is to provide an improved universal joint for use in parallel kinematic structures, which joint helps to assure that true spherical motion is achieved in the joints during operation of the machine.

Still another object of the invention is to provide an improved coordinate measuring machine having improved dynamic performance due to low mass of the moving elements and the insensitivity of the probe position to bending of the actuators.

A still further object of the invention is to provide an improved coordinate measuring machine which enables reduced operational and inspection costs as compared to known devices.

These and other objects and advantages are achieved by the present invention, which provides a coordinate measuring machine, including three spherical base joints, means for maintaining the base joints in a fixed spaced relation, and six actuator assemblies each having a variable length. Each of the base joints has a first end of two of the six actuator assemblies connected therewith, respectively. A center pole is provided having a first spherical joint connected to a first end thereof and a second spherical joint connected to a second end thereof. A second end of a first one of each of the two actuator assemblies connected to each of the base joints is connected to the first spherical joint of the center pole, and a second end of a second one of each of the two actuator assemblies connected to each of the base joints is connected to the second spherical joint of the center pole, in a manner which forms a hexahedron. The coordinate measuring machine further includes a probe mounted at one end of the center pole and means for determining a change in length of each of the six actuator assemblies upon movement of the probe, such as, for example, a laser interferometer.

In accordance with another aspect of the invention, the base joints and first and second spherical joints are spheres, and the first and second ends of the actuator assemblies are magnetic sockets which enable connection with the respective spheres by a magnetic force.

In accordance with another aspect of the invention, the base joints and the first and second spherical joints are universal joints, wherein each joint includes a stationary reference sphere mounted at a center point thereof, and the machine further includes means for using the reference sphere to enable compensation for any non-spherical motion by the universal joints during movement of the probe.

In accordance with yet another aspect of the invention, a method is provided for initializing the hexahedron coordinate measuring machine, including the steps of displacing the center pole a plurality of times, obtaining information on a change in the length of each actuator assembly for each displacement, and using the information obtained and a least square algorithm to determine the initial length of each leg and a distance between each of the base joints, thereby initializing the machine.

In accordance with a further aspect of the invention, a method and means are disclosed for continuously self-initializing the machine, so that the machine becomes insensitive to environmental conditions.

BRIEF DESCRIPTION OF THE DRAWINGS

Other objects and advantages of the subject invention will become apparent from a study of the following specification when viewed in light of the accompanying drawings, in which.

DETAILED DESCRIPTION OF PREFERRED EMBODIMENTS

Figure 1:
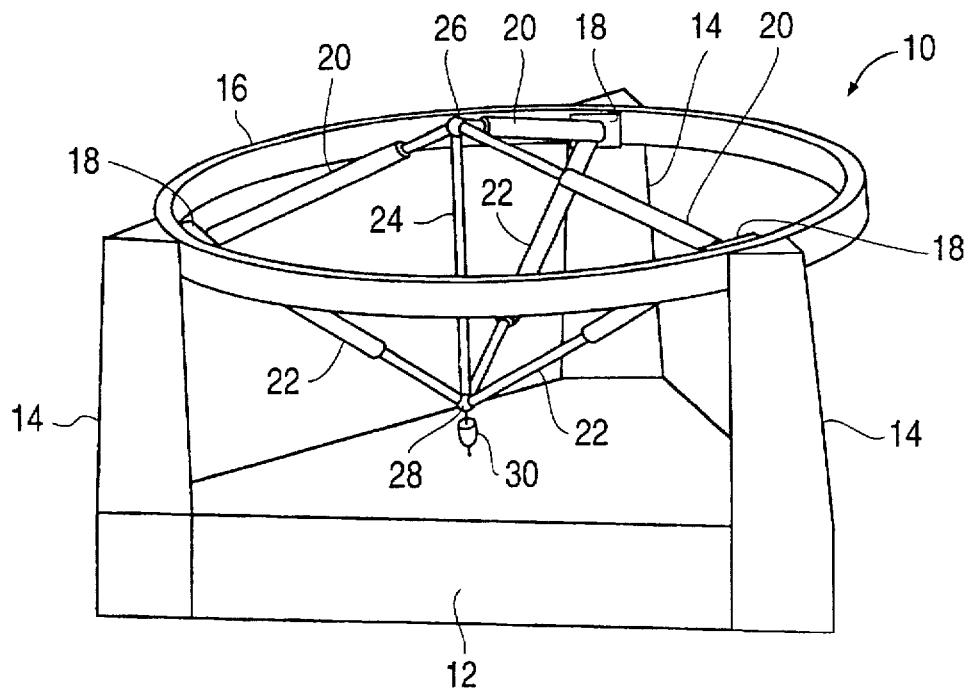
FIG. 1 shows an elevational view of a preferred embodiment of the coordinate measuring machine (CMM) of the instant invention.

Referring now to the drawings, wherein like reference numerals designate similar parts throughout the various views, and more particularly to FIG. 1, there is shown a preferred embodiment of the coordinate measuring machine (CMM) 10 of the instant invention. The CMM 10 includes a granite baseplate 12, or other rigid base plate, supporting three posts or legs 14. A ring member 16 is kinematically mounted to the posts 14, and three spherical base joints 18 are attached to the inside surface of the ring 16. Six actuator assemblies, preferably in the form of telescoping rods or legs, are provided, wherein two actuator assemblies 20 and 22 have a first end connected with each of the spherical base joints 18, respectively. The actuator assemblies 20 and 22 are preferably similar to the type shown in U.S. Pat. No. 5,428,446, known as the laser ball bar (LBB), which patent is hereby incorporated herein by reference. The LBB provides a ball bar gage that integrates an laser interferometer with a telescoping ball bar. As will be explained in more detail below, the laser interferometer enables information on the changes in length of each of the actuator assemblies 20 and 22 to be measured. While actuators in the form of LBBs are preferred, any type of suitable actuators and means for measuring changes in length thereof can be used in accordance with the instant invention. In accordance with the invention, the actuator assemblies may be either passive or active actuator assemblies. In other words, any type of variable length linear motion device may be used to define the actuator assemblies.

The CMM further includes a center pole 24 having a spherical joint 26 and 28, respectively, at each end thereof. One actuator 20 of the two actuators 20 and 22 connected to each base joint 18 has a second end connected to the upper spherical joint 26 on the center pole 24. The other actuator 22 connected to each base joint has a second end connected to the lower spherical joint 28 on the center pole 24. Thus, the upper and lower spherical joints on the center pole 24 each carry the ends of three actuators, one from each base socket 18. In this manner, a hexahedron is formed consisting of two tetrahedra with a common base.

The CMM 10 further includes a probe 30 attached to the lower spherical joint 28 of the center pole 24. The probe is preferably a touch-trigger type probe, but a capacitance or optical probe or any other suitable probe that senses contact can be used. The probe 30 is mounted such that the center of its tip 64 is collinear with the centers of the top and bottom spherical joints 26 and 28.

Figure 2:
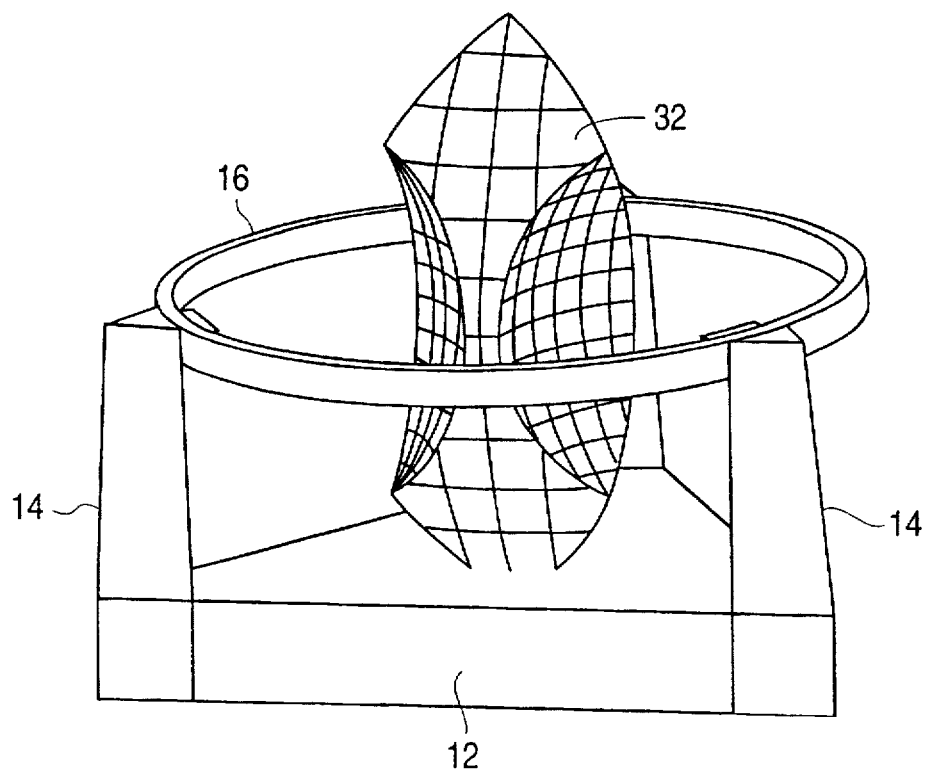
FIG. 2 shows the locus of attainable positions for the first and second spherical joints on the center pole of the coordinate measuring machine (CMM) of FIG. 1.

The workspace of the CMM 10 is complex in shape. Visualization of the workspace geometry is complicated by the ability to position the tip 64 of the probe 30 at a given location, but with an arbitrary orientation. FIG. 2 shows the locus 32 of attainable positions for the upper and lower spherical joints 26 and 28 of the center pole 24. In one embodiment, that machine was sized to provide a workspace which would minimally encompass a cylinder 380 mm in diameter by 420 mm high with the probe held vertically. This is comparable to the work volume of small- to medium-sized CMMs which are commercially available. The ring member 16 and the posts 14 are preferably constructed such that ring 16 can be moved up and down on the posts 14, and/or that base joints 18 can be moved to different locations around the ring member 16, to enable the size, shape and location of the work zone or locus 32 of attainable positions to be easily changed to accommodate particular geometries of parts to be measured with the CMM 10. In one embodiment, the resulting structure has nominal base lengths of 1.6 m, the minimum actuator length is 760 mm, the maximum actuator length is 1,295 mm, and the center rod length is 812 mm. While use of the posts 14 and ring member 16 provide certain advantages and flexibility in use of the machine, any manner of mounting the three base joints 18 in a fixed location can alternatively be used.

The reference coordinate system for the machine is defined by the base joints 18. The origin is at the center of one of the base joints 18 (joint #1). The X axis lies along the line joining the centers of joints #1 and a second base joint 18 (joint #2). The Y axis is perpendicular to the X axis and lies in the plane of the centers of the three base joint 18. The Z axis is perpendicular to axes X and Y. Thus, a perfect Cartesian coordinate system is unambiguously defined by the locations of the centers of the three base joints 18.

If the three base lengths and the absolute lengths of all six actuators 18 of the hexahedron are known, then the coordinates of the centers of the spherical joints 26 and 28 at the top and bottom of the center pole 24 are easily calculated, since each is at the apex of a tetrahedron formed by the center pole and the base sockets 18. Furthermore, the position is unique. Any given set of lengths of the actuators 20 and 22 can result in only one spatial position of the top and bottom spherical joints 26 and 28 on the center pole 24. Since the coordinates of the centers of these spherical joints are known and the probe length is known, the coordinates of the tip 64 of the probe 30 are easily computed. Dimensions of probed features on parts to be measured are easily computed from the probe tip coordinate data.

The hexahedral configuration of the CMM 10 offers many advantages. The geometry is completely deterministic and obeys the principles of minimal constraint and kinematic mounting. The configuration further obeys the Abbe alignment principle completely since each actuator's measurement axis is always aligned with one of the base joints and one of the center rod spherical joints. The design provides five degrees of freedom of motion (three translation, two rotation, but no rotation about the axis of the center rod). This allows the probe 30 to be oriented in an optimal manner in relation to the surface of the work, thus reducing or eliminating errors due to directional effects in the probe 30. However, the configuration of the CMM 10 described above raises a number of design challenges that have been addressed as described below. These include design of the spherical joints 18, 26 and 28, initialization to determine the absolute lengths of the actuators 20 and 22 and distance between base joints 18, thermal stabilization, accurate actuator length measurement and actuation of the device 10.

Figure 3:
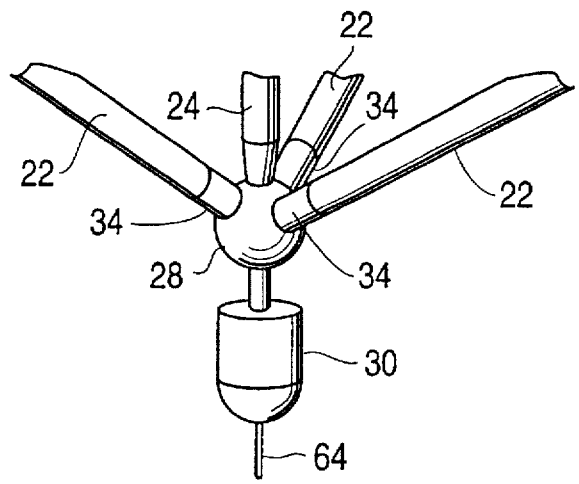
FIG. 3 shows an enlarged view of the second or lower spherical joint on the center pole, the three magnetic sockets connected therewith and the probe of FIG. 1.

FIG. 3 shows an enlarged view of one preferred embodiment of the spherical joint used in the CMM of FIG. 1. The joints use the same basic magnetic socket and ball design as used for the LBB. In this case, however, the balls on the ends of the LBBs are replaced by magnetic sockets 34. In this manner, multiple LBBs can ride on the single ball or sphere 28. While only the lower joint 28 is shown, it is understood that a similar sphere and magnetic sockets can be used for each of the base joints and the upper spherical joint on the center pole 24. The primary problems with this design modification to the LBB lie in two areas. The first area is interference between the sockets riding on the single ball during machine motions. Interference can obviously be minimized by making the sockets 34 small in diameter relative to the ball 28. However, this strategy leads directly to the second area of concern, which is maintenance of contact between the sockets 34 and the ball 28 during motion. If the socket diameter is too small, it will tip off the ball rather than slide across its surface during machine motions.

The maximum allowable socket diameter can be calculated by considering the angle between adjacent LBB axes as the machine moves through its workspace. For the joint shown in FIG. 3, the minimum angle was found to be 36° which results in a maximum allowable socket diameter of 17 mm. assuming a 50 mm diameter ball. Based on experience with the LBB, no difficulty is encountered in fabricating magnetic sockets of this diameter with sufficient attractive force.

An analysis of the sliding versus tipping problem shows that this is governed by the coefficient of friction between the ball 28 and sockets 34. The results of this analysis showed that a coefficient of friction of less than 0.4 should result in a satisfactory performance. The measured coefficient of friction of the current LBB ball and socket assembly (stainless steel socket and stainless steel balls) was in the neighborhood of 0.4. Therefore, two conventional LBBs were modified by placing small diameter sockets on their ends to test this design. It was found that the results confirmed the simplified analysis. The arrangement worked satisfactorily except when the LBBs were at maximum extension which is the critical case. Here, the sockets sometimes had a tendency to tip off the ball rather than slide across it. Slow and careful motions can usually prevent this problem. However, for a robust system, the friction coefficient between the ball and socket can be reduced. This can be accomplished by providing anti-friction coatings for the surfaces of the sockets 34, including Teflon and thin-film diamond.

Figure 5:
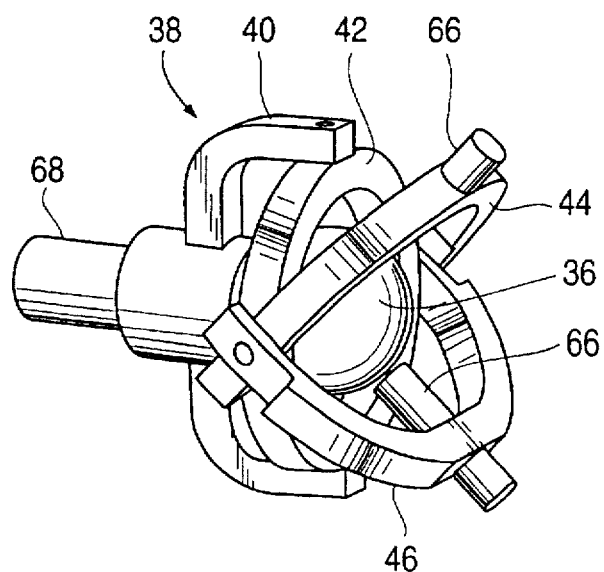
FIG. 5 shows a perspective view of a preferred embodiment of an improved universal joint for use on the coordinate measuring machine (CMM) of FIG. 1.

In accordance with another embodiment of the instant invention, an alternative joint design, as shown in FIG. 5, is employed which uses a Hooke joint (universal joint) modified to have a precision sphere 36 mounted in the center thereof. The sphere 36 acts as a reference artifact to enable detection of any deviation from true spherical motion during operation of the joint. A Hooke joint or universal joint is a spherical joint. However, it is virtually impossible to economically manufacture the components of a universal joint accurately enough or stiff enough so that the assembled joint would produce truly spherical motion. Therefore, in accordance with the instant invention, the stationary reference sphere 36 is mounted inside the joint. A capacitance gauge or other type of proximity gauge 66 is provided in the actuators 20 and 22 to measure the distance from the actuator end to the surface of the precision sphere 36 as the joint articulates. In this way, any deviations from perfectly spherical motion will be measured and can be combined with the interferometer displacement measurements to obtain the true distance between joint centers. In an alternative embodiment, the laser beam of the interferometer can be focused directly onto the surface of the precision sphere 36, instead of using retroreflectors at the ends of the actuators, thus obviating the need for the capacitance gauges. One advantage of this alternative joint design is that the spheres are never touched or loaded during the operation of the CMM 10. Therefore, wear will not be a factor and the useful life of the joint will be increased.

FIG. 5 shows an example of the modified universal joint 38 having two outputs 34 which is suitable for use as one of the base joints 18 on the CMM 10. The joint 38 includes a spherical four-bar linkage with two outputs, comprised of a stationary shaft 68, a yoke 40 operable to rotate about the shaft 68, three pivotable yokes 42, 44 and 46, and the precision sphere 36 mounted on the shaft 68 at the center of the joint 38. A spherical four-bar linkage with three outputs (not shown) and a precision sphere mounted at the center point thereof can be used for the spherical joints 26 and 28 on the center pole 24, thus creating the concentric spherical joints required by the CMM 10 of the instant invention.

Figure 4:
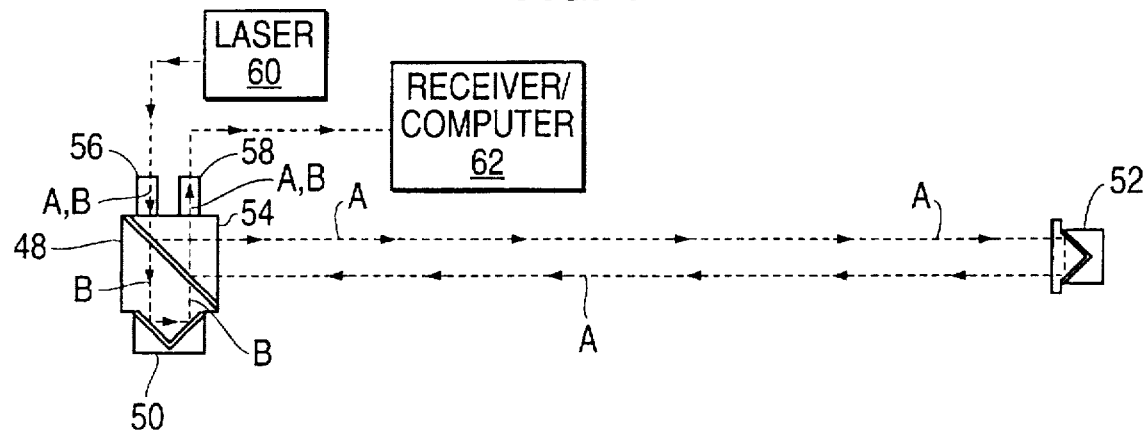
FIG. 4 shows a diagrammatic view of the operation of the laser interferometer used with the coordinate measuring machine (CMM) of FIG. 1.

The operation of the interferometer used to determine changes in length of each of the actuators 20 and 22 is shown in FIG. 4. The interferometer includes a polarization beam splitter (PBS) 48, fixed retroreflector 50, movable retroreflector 52, optical pickup 54, and fiber optic cables 56 and 58 (only partially shown). Fiber optic cable 56 transmits a light signal from a light source which, for example, may be a suitable laser depicted by box 60. Fiber optic cable 58 transmits the output signal to a suitable receiver/computer depicted by box 62. Both the laser and receiver/computer are commercially available and well-known devices.

In operation, the light beam emitted from the laser 60 is carried to the PBS by fiber optic cable 56 which is a polarization preserving cable. The laser beam is comprised of two plane and orthogonally polarized beams identified as lines A and B which are separated by PBS 48. PBS 48 reflects the vertical component beam A to the movable retroreflector 52 and the horizontal component beam B, which passes through the PBS 48, to the fixed retroreflector 50. Beam B is relayed to the optic pick-up 54 by the movable retroreflector 52 where both beams are combined and transmitted to the receiver/computer 62. Thus, after the interferometer is energized, it is capable of ascertaining any displacement of the actuators. As the actuators 20 and 22 move relative to the initialization point, the interferometer will register a signal indicative of a change in length of the actuator. The computer will then perform the requisite computations to ascertain the precise changes in length of the actuators. Inasmuch as the interferometer is only a relative displacement device, it can only measure changes in length. In order for the coordinates of a point to be measured, it is necessary to convert the displacements to absolute lengths. This can be accomplished by initializing the CMM in the manner described below, so that the interferometer measures deviations from the initialized lengths.

In order to calculate the coordinates of the joints on the center pole 24 and thereby the tip of the probe 30, the absolute distances between the centers of the base sockets (base lengths), as well as the absolute lengths of the hexahedron sides, must be known. When the laser interferometers in each actuator are turned on, the legs have some finite length which is unknown. The interferometers keep track of the changes in the actuator lengths as they extend and retract. However, in order to know the absolute actuator lengths, their initial lengths at the time the interferometers were energized must also be known. While it might be possible to use an initialization fixture for each of the actuators, like that used for the LBB as described in the '446 patent, this would require the actuators to be removed from the machine for initialization, which would limit the utility of the machine. Due to the physical size of the base, it would be difficult to determine the base lengths to the required accuracy by direct measurement. Therefore, in accordance with the instant invention, a self-initialization procedure is provided.

The hexahedral CMM 10 has only five degrees of freedom of motion, but possesses six actuator length sensors. This implies that a redundancy exists which may be exploited to determine the initial lengths of the actuators and the base lengths. The constraint which exists is that the distance between the centers of the top and bottom spheres on the center rod must be constant (assuming a rigid center rod). Therefore, it is possible to formulate the expression for the distance between the top and bottom spheres in terms of the unknown base lengths and initial leg lengths plus the known leg length changes. This can be done for a number of different positions of the center rod 24. For each position, the center rod length is assumed to remain constant. Thus, a least squares problem can be formulated to find the set of base lengths and initial leg lengths which minimize the variation in the computed center rod length. If the center rod is designed to be stiff enough so that elastic deformations are negligible and if the data is gathered over a short enough period of time so that thermal changes in the base lengths and the length of the center rod are minimized, then this procedure will result in valid initial actuator lengths and base lengths.

The self-initialization process is used any time the power to the machine is interrupted or the laser beams are broken. The self-initialization procedure is as follows: first, a measurement signal is obtained from the lasers in all six actuators with the center pole 24 held steady. The center pole 24 is then given random small displacements. These displacements should occur over a short enough period of time that the center pole length and the base lengths will not have time to undergo any thermally induced changes. After each displacement, the change in the length of each actuator is determined from the individual laser interferometers, as described above. When a predetermined number of such data sets have been collected, the least square algorithm is used to compute the initial length of each leg, as well as the base lengths. From this information, the spatial coordinates of the top and bottom center rod spheres at any position of the center rod can be computed. The spatial coordinates of the probe tip center are then computed from knowledge of the center rod endpoints.

One of the objects of the instant invention is to produce a CMM which need not be housed in a specially controlled environment in order to maintain its accuracy. However, changes in temperature will lead to changes in the base lengths, as well as the center rod length. Therefore, in accordance with the invention, the self-initialization procedure described above is used to continuously correct for thermally induced changes in the base lengths and center rod length.

During machine use, the center rod length can be calculated at each measurement point as the vector distance between the top and bottom sphere centers. If, over time, this distance changes by more than some allowable tolerance, it is due to thermal growth of the base, center pole or the unsensed portion of the leg lengths (i.e., distance from the retroreflector apexes to the ends of the legs). When this happens, the self-initialization process is repeated. In accordance with a preferred embodiment of the invention, a running buffer of information on the leg length changes is kept since initialization for the last N measurement points or for the last M seconds, and this information is used to continuously update the initialization data.

By using a continuous updating of the initialization data, the accuracy of the CMM 10 can be made insensitive to changes in its thermal environment. There will always be three base spheres which form a unique coordinate frame. The accuracy of coordinate estimation with respect to this frame is dependent on the accuracy of knowledge of the initial leg lengths and base lengths, as well as the accuracy of displacement measurement in each leg. The self-initialization procedure allows the base lengths and the initial leg lengths to be continuously updated. Environmental sensors (air temperature, barometric pressure and relative humidity) may be used in conjunction with Edlen's formula to correct for changes in the refractive index of air, thus improving the accuracy of interferometric displacement measurement. As a result, the spatial coordinate measurement accuracy of the CMM 10 is quite insensitive to the environmental conditions, thereby reducing or eliminating the need for environmental enclosures and allowing the machine to be used directly on a factory floor.

One potential area of concern is that thermal distortions of the machine base and posts will cause changes in the location of the part with respect to the reference coordinate frame. These deformations occur in portions of the machine which are outside of the metrology structure of the machine (i.e., the hexahedron) and, therefore, the self-initialization procedure will not sense these changes or correct for them. If significant distortions of the base occur during the course of measurement of a single object or feature, then measurement errors will result. Conventional CMMs are also susceptible to this problem. To help minimize this problem, measurements with the CMM 10 should be conducted in a short enough period of time so that such deformations are not significant. This assumes that the spatial measurement accuracy of the metrology system is not adversely affected by the thermal gradients, which is not true for conventional CMMs since such gradients cause their members to bend and axes to change their alignments. The spatial accuracy of the hexahedron CMM, on the other hand, is largely unaffected by the thermal state of the machine due to the continuous self-initialization procedure described above.

Frequent re-measurement of reference surfaces or features on the part to be measured can be used to determine if the part is drifting with respect to the machine coordinate system. The time constant for thermal deformation of the machine structure connecting the part to the reference coordinate system is the determining factor for acceptable measurement cycle times. One design alternative to reduce this effect is to use materials with a low coefficient of thermal expansion such as Invar. However, these materials are generally considered too expensive for general purpose CMMs. Another alternative is to increase the heat capacity or thermal mass of the machine elements. This approach generally results in physically massive machine members. On conventional CMMs, these members are a part of the kinematic structure and must move during the measurements. Making them massive is severely detrimental to the dynamic performance of the machine. As an extreme example, consider the Moore M-60 CMM (one of the most accurate of its class in the world). The maximum traverse rate for this machine is only twelve inches per minute. In contrast, on the hexahedron CMM, the material which connects the reference coordinate frame to the part (base plate 12 and posts 14) is not part of the kinematic structure and is intended to remain stationary. Therefore, there is no penalty in dynamic performance when these elements are made extremely massive and rigid.

The accuracy of displacement measurement in air using interferometry is affected by environmentally induced changes in the refractive index of light. For example, errors of approximately 1 part in $10^6$ will occur with a 1° C. temperature change. Two alternatives, evacuated laser paths and helium filled laser paths, may also be utilized to help reduce this error.

Since the wavelength of light is constant in a vacuum, the ideal situation for performing interferometry is to have the measurement beam travel in a vacuum. This can be accomplished in the actuators 20 and 22 by using an evacuated flexible metal bellows connecting the beam splitter to the end of the telescoping tube. This arrangement will, of course, create a force on the telescoping element, causing it to tend to retract into the cylinder. The actuation system described below must overcome this force. Use of the evacuated bellows also allows the actuators 20 and 22 to function as pneumatic cylinders for actuation of the CMM. This approach to system actuation will be described more fully below.

Another option is to fill the inside of the actuators 20 and 22 with low pressure helium. The refractive index of helium is approximately one order of magnitude less sensitive to temperature changes than air. However, if seals are used on the leg joints to prevent leakage of the helium, it is likely that the friction of the seals would cause unacceptable hysteresis. Therefore, a cast-in-place bearing material (Moglice™) to create the sliding bearing for the movable tube can be used, resulting in acceptable frictional characteristics combined with very small radial clearances between the shaft and bearing. A very low supply pressure of helium is utilized and controlled leakage is allowed through the small gap between the shaft and bearing. The leakage also helps to provide a gas cushion for the bearing, further reducing friction.

The kinematic structure of the hexahedral CMM 10 of the invention has been described in detail above. The means for actuation and control of this structure to produce motion of the probe tip can take a variety of forms. The structure can be treated as a passive metrology frame to be actuated manually by a human operator or by some external robotic device. To make maximum use of the capabilities of the hexahedron CMM 10, the external motion generator must be capable of motion in the same five degrees of freedom as the hexahedron CMM 10. Another option is to integrate prismatic actuators into the telescoping legs or actuators 20 and 22 themselves.

The preferred method is to construct the hexahedral CMM 10 as a passive device to be actuated externally. The University of Florida Center for Intelligent Manufacturing and Robotics GE P-60 robot has been found to be suitable for use as an external actuation device. This six degrees of freedom manipulator is mounted adjacent to the CMM 10. The end effector of the robot reaches into the CMM 10 workspace to grasp the center rod of the CMM 10. The robot controller is integrated with the CMM 10 to provide position and orientation feedback of the tip of the probe 30 signals during probing cycles and prevention of over-travel of any of the CMM legs. In this manner, the robot can be programmed to move the probe tip through space without going outside of the CMM workspace or locus 32, and to perform probing cycles to accomplish part measurements.

In the broadest sense of good design practice for precision machines, the instant hexahedral CMM 10 provides an advantageous configuration. The hexahedral CMM 10 serves strictly as a metrology frame and carries none of the actuation loads. However, the addition of an external robotic actuation system adds significant additional expense to the machine. Serial robots of this type are notorious for their lack of stiffness and high mass relative to their payload capacity. These are exactly the wrong characteristics for good dynamic performance. Therefore, other methods for incorporating prismatic actuators into the legs or actuators 20 and 22 of the CMM can be utilized. Suitable alternatives include ball screws and linear motors, as well as hydraulic and pneumatic actuators. The optical layout of the displacement measuring interferometer system in each leg 20 and 22 must be preserved in order to obey the Abbe alignment principle and preserve the metrological characteristics of the device. This limits the design choices. Therefore, pneumatic actuation of the legs is typically the preferable alternative. To preserve the integrity of the laser beam along the axis of the leg 20 and 22, vacuum bellows can be employed to connect the interferometer to the end of the moving tube part of the leg. Outside of this evacuated laser path, the telescoping leg 20 and 22 can be constructed to resemble a double-acting pneumatic cylinder. Achievement of the required force, stiffness, speed and resolution of actuation of a single leg enable the CMM 10 to be self-actuated. This embodiment will not seriously compromise the accuracy of the system since each of the legs 20 and 22 is loaded only in the axial direction and the actual axial length is continually being sensed by a system which is largely unaffected by this load. When viewed in this sense, the metrology frame is the system of laser interferometer beams which happen to be arranged coaxially within the structural elements of the CMM 10. In this manner, an improved CMM 10 is achieved which offers good metrology and good dynamic performance at a reasonable cost.

A preliminary error budget was constructed at the design stage of the CMM 10 of the instant invention, to determine the accuracies which were likely to be achieved therewith. Since the hexahedron configuration of the CMM 10 is essentially composed of two tetrahedra sharing a common base, an error budget approach similar to that used for the development of the LBB was employed. The error budget for the LBB considered a number of factors such as thermal and elastic growth of the unmeasured portions of the LBB length, alignment of the beam to the sliding axis and bending of the LBB tubes, among other factors. The predicted absolute length uncertainty was ±0.25 µm and the predicted spatial measurement uncertainty was ±0.6 µm. The accuracy of this instrument was subsequently tested on the Moore M-60 CMM in Oak Ridge, Tenn. These tests showed a spatial measurement uncertainty of approximately ±0.5 µm, assuming the M-60 to be perfect. The agreement between experimental results and the error budget predictions gives confidence in the analysis.

A similar procedure was used to estimate the uncertainty of measurement of the coordinates of the centers of the top and bottom spheres on the center rod 24. The probe tip location uncertainty was then obtained by projecting lines from the extremes of the uncertainty zones for each sphere. The result of this analysis is a projected probe location uncertainty of ±2.8 µm. When combined with the errors induced by the probing system, the accuracy of the CMM 10 measurements is defined. The preliminary error budget is shown in Table 1. This predicted accuracy is very good for a machine of this size. More importantly, due to the design of the CMM 10 and the method for continuous reinitialization disclosed above, this accuracy is essentially independent of the temperature of the surrounding environment or the rate of change of that temperature, thereby providing a significant improvement over known CMMs.

As will be apparent from the description above, the instant invention provides applicability of platform-type mechanisms to coordinate measuring machines. The invention provides a novel kinematic structure which builds upon the inventor's previous development of the laser ball bar (LBB). This kinematic structure or hexahedral CMM 10 enables implementation of a continuous initialization scheme which makes the accuracy of the CMM 10 extremely insensitive to its thermal environment. This allows the CMM 10 to be placed directly on the shop floor and more fully integrated into the production flow, thereby reducing or obviating the need for temperature controlled rooms and significantly reducing installation costs for CMMs. In addition, the CMM 10 of the instant invention has significantly better dynamic performance, because the mass of the moving elements therein is much lower than in conventional CMM designs.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

TABLE 1

Hexahedral CMM - Preliminary Error Budget

| Error Source | (−) μm | (+) μm |
| --- | --- | --- |
| Thermal Growth Between Spheres and Optics | −0.3200 | 0.3200 |
| Cosine Alignment of Laser to Slide Motion | −0.0584 | 0.0000 |
| Sphere-line Misalignment to Slide Motion | 0.0000 | 0.0866 |
| Deadpath | −0.3127 | 0.3127 |
| Beam Misalignment from Optic's Rotation | −0.2251 | 0.0000 |
| Sphericity of Ball/Socket Combination | −0.1200 | 0.1200 |
| Elastic Elongation of Components | −0.0094 | 0.0000 |
| Laser Stability and Intrinsic Factors | | |
| Laser Stability | −0.0160 | 0.0160 |
| Polarization and Incidence Alignment | −0.0008 | 0.0008 |
| Fiber Optic Cable Mechanical Errors | −0.0400 | 0.0400 |
| Fiber Optic Cable Thermal Errors | −0.1900 | 0.1900 |
| RSS LENGTH ERROR | −0.5538 | 0.5099 |
| Mean RSS LENGTH ERROR | −0.5319 | 0.5319 |
| Error in Position of Probe Tip | | |
| X | −1.5649 | 1.5649 |
| Y | −1.4338 | 1.4338 |
| Z | −1.9000 | 1.9000 |
| PROPAGATED ERROR OF PROBE TIP | −2.8486 | 2.8486 |

I claim:

1. A coordinate measuring device, comprising three spherical base joints, means for maintaining said base joints in a fixed spaced relation, six actuator assemblies each having a variable length, wherein each of said base joints has a first end of two of said six actuator assemblies connected therewith, respectively, a center pole having a first spherical joint connected to a first end thereof and a second spherical joint connected to a second end thereof, wherein a second end of a first one of each of said two actuator assemblies connected to each of said base joints is connected to said first spherical joint of said center pole and a second end of a second one of each of said two actuator assemblies connected to each of said base joints is connected to said second spherical joint of said center pole in a manner which forms a hexahedron, said device further including a probe mounted at one end of said center pole and means for determining a change in length of each of said six actuator assemblies upon movement of said probe.

2. A coordinate measuring device as defined in claim 1, wherein said means for determining a change in length of each of said six actuators includes a laser interferometer.

3. A coordinate measuring device as defined in claim 2, wherein each of said six actuator assemblies has a hollow interior and said means for determining a change in length of each of said six actuators further includes means for delivering a laser beam to said hollow interior of each of said actuator assemblies.

4. A coordinate measuring device as defined in claim 3, wherein said means for delivering said laser beam includes single mode, polarization preserving, fiber-optic cable.

5. A coordinate measuring device as defined in claim 1, wherein said base joints are spheres, and said first ends of said actuator assemblies are magnetic sockets which enable connection with said spheres by a magnetic force.

6. A coordinate measuring device as defined in claim 1, wherein said first and second spherical joints on said center pole are spheres, and said second ends of said actuator assemblies are magnetic sockets which enable connection with said spheres by a magnetic force.

7. A coordinate measuring device as defined in claim 1, wherein said base joints and said first and second spherical joints are spheres, and said first and second ends of said actuator assemblies are magnetic sockets which enable connection with said spheres by a magnetic force.

8. A coordinate measuring device as defined in claim 1, wherein said base joints are universal joints.

9. A coordinate measuring device as defined in claim 1, wherein said first and second spherical joints on said center pole are universal joints.

10. A coordinate measuring device as defined in claim 1, wherein said base joints and said first and second spherical joints are universal joints.

11. A coordinate measuring device as defined in claim 10, wherein said universal joints each include a stationary reference sphere mounted at a center point thereof, and said device further includes means for using said reference sphere to enable compensation for any non-spherical motion by said universal joints during movement of said probe.

12. A coordinate measuring device as defined in claim 11, wherein said means for using said reference sphere includes a proximity gauge which measures a distance between said actuator assemblies and said reference sphere, respectively, during movement of said probe.

13. A coordinate measuring device as defined in claim 11, wherein said means for using said reference sphere includes means for enabling said laser beam to reflect off of said reference sphere.

14. A coordinate measuring device as defined in claim 1, wherein said means for maintaining said base joints in a fixed spaced relation includes a support leg for each base joint.

15. A coordinate measuring device as defined in claim 1, wherein said means for maintaining said base joints in a fixed spaced relation includes a ring member and means for supporting said ring member, and further wherein said ring member includes means for enabling said base joints to be selectively connected with said ring member at a plurality of different relative positions thereon to enable modification of a locus of attainable positions of said probe.

16. A coordinate measuring device as defined in claim 1, further comprising means for self-initializing said device, including means for displacing said center pole a plurality of times, means for obtaining information on a change in the length of each of said actuator assemblies for each displacement, and means for using said information and a least square algorithm to determine an initial length of each leg and a distance between each of said base joints, thereby enabling initialization of said device.

17. A coordinate measuring device as defined in claim 16, wherein said means for displacing is operable to displace said center pole said plurality of times at a rate which is more than the rate at which the device is capable of undergoing any significant thermally induced changes.

18. A coordinate measuring device as defined in claim 16, further including means for continuously performing said self-initialization procedure during operation of said machine to enable accuracy of said device to be insensitive to changes in environmental conditions.

19. A method of initializing a coordinate measuring machine, said machine including three spherical base joints, means for maintaining said base joints in a fixed spaced relation, six actuator assemblies each having a variable length, wherein each of said base joints has a first end of two of said six actuator assemblies connected therewith, respectively, a center pole having a first spherical joint connected to a first end thereof and a second spherical joint connected to a second end thereof, wherein a second end of a first one of each of said two actuator assemblies connected to each of said base joints is connected to said first spherical joint of said center pole and a second end of a second one of each of said two actuator assemblies connected to each of said base joints is connected to said second spherical joint of said center pole in a manner which forms a hexahedron, said device further including a probe mounted at one end of said center pole and means for determining a change in length of each of said six actuator assemblies upon movement of said probe, said method comprising the steps of displacing said center pole a plurality of times, obtaining information on a change in the length of each of said actuator assemblies for each displacement, and using said information and a least square algorithm to determine an initial length of each leg and a distance between each of said base joints.

20. A method of initializing a coordinate measuring machine as defined in claim 19, further including the step of continuously performing said self-initialization procedure during operation of said machine to enable accuracy of said device to be insensitive to changes in environmental conditions.

* * * * *

UNITED STATES PATENT AND TRADEMARK OFFICE
CERTIFICATE OF CORRECTION

PATENT NO. : 5,797,191
DATED : May 25, 1998
INVENTOR(S) : John C. Ziegert

It is certified that error appears in the above-identified patent and that said Letters Patent is hereby corrected as shown below:

Column 1,
Line 4, "PARALLEL KINEMATIC STRUCTURE FOR SPATIAL POSITIONING DEVICES AND METHOD OF INITIALIZING SAME" insert -- Research leading to the completion of the invention was supported, in part, by Grant Nos. DDM-935-8138 and DMI-963-4921 awarded by the National Science Foundation. The United States Government has certain rights in and to the invention claimed herein. --

Signed and Sealed this

Twentieth Day of August, 2002

Attest:

Attesting Officer

JAMES E. ROGAN
Director of the United States Patent and Trademark Office